United States Patent [19]
Enomoto et al.

[11] Patent Number: 5,444,798
[45] Date of Patent: Aug. 22, 1995

[54] SYSTEM FOR DETECTING AN EDGE OF AN IMAGE

[75] Inventors: Hajime Enomoto, Kawasaki; Isao Miyamura, Niigata, both of Japan

[73] Assignee: Fujitsu Limited, Kawasaki, Japan

[21] Appl. No.: 174,627

[22] Filed: Dec. 28, 1993

Related U.S. Application Data

[63] Continuation of Ser. No. 853,182, Mar. 18, 1992, abandoned.

[30] Foreign Application Priority Data

Mar. 18, 1991 [JP] Japan .................................. 3-051867

[51] Int. Cl.⁶ ............................................. G06K 9/48
[52] U.S. Cl. ................................. 382/199; 382/165
[58] Field of Search ........................... 382/22, 56, 17; 348/396, 486

[56] References Cited

U.S. PATENT DOCUMENTS

| | | | |
|---|---|---|---|
| 4,618,989 | 10/1986 | Tsukune et al. | 382/22 |
| 5,126,834 | 6/1992 | Enomoto et al. | 358/28 |
| 5,126,838 | 6/1992 | Ohsawa et al. | 358/75 |
| 5,148,501 | 9/1992 | Enomoto et al. | 382/22 |

OTHER PUBLICATIONS

Enomoto, H. et al., "Vector Representation Scheme of High Quality Picture", *Signal Processing of HDTV, II at the Third International Workshop in HDTV*, Sep. 1, 1989, pp. 863–870.

San-oh T. et al., "Hierarchical Encoding of Color Images with Multi-Stage BTC Scheme", *Research Reports of Kogakuin University, pl No. 64, apr. 1988, pp. 282–289*.

Carlsson, Stefan, "Sketch Based Coding of Grey Level Images", *signal Processing*, vol. 15, No. 1, Jul. 188, pp. 57–83.

*Primary Examiner*—Leo H. Boudreau
*Assistant Examiner*—Chris Kelley
*Attorney, Agent, or Firm*—Staas & Halsey

[57] ABSTRACT

A system for correctly detecting an edge of an image in which a first set of edges are corrected by a second set of edges which are detected as errors between an original image and a reproduced image obtained using the first set of edges. The edges may be in luminance components or lamellar chrominance components of a color image. A third set of edges obtained by applying a smaller threshold to the original image may be used to refine the second set of edges.

11 Claims, 9 Drawing Sheets

ORIGINAL IMAGE / LUMINANCE

Fig. 5B

DESIRED EDGE TO BE DETECTED

Fig. 5C

REPRODUCED RECONSTRACTED IMAGE / LUMINANCE

Fig. 5D

ERROR IMAGE

Fig. 5E

EDGE EXTRACTED FROM ERROR IMAGE

SYSTEM FOR DETECTING AN EDGE OF AN IMAGE

This application is a continuation, of application Ser. No. 07/853,182, filed Mar. 18, 1992, now abandoned.

BACKGROUND OF THE INVENTION

1. Field of the Invention

The present invention relates to an image-processing system for separating an image into lamellar components and vortex components and processing these components, and particularly, to a system for correctly detecting edges of an original color image, to reproduce the original color image.

It is desired to efficiently transmit and reproduce color image data of a picture or a relief formed on a wall surface, or of a curved surface of an object such as a car body. To this end, edges of an original color image are detected. Once the edges are detected, only the data of the detected edges are transmitted to the receiver, and at the receiving side, the original color image is reproduced by using the received data of edges and by using interpolation.

Accordingly, to correctly detect the edges is important.

2. Description of the Related Art

The applicant of the present application previously filed a Japanese Patent Application No. 62-133690 entitled Color Image Transmission Processing System, a Japanese Patent Application No. 63-39284 entitled Color Image Edge-detecting and Transmission Processing System, and a Japanese Patent Application No. 2-066149 entitled Scalar Data Processing System.

In the first Japanese patent application No. 62-133690, an original color image is separated into luminance components and chrominance components, and the chrominance components are separated into lamellar components that are scalar potential components and vortex components that are vector potential components. The vortex components are compressed as compact as possible for transmission, to reduce the quantity of data to transmit.

While the first Japanese patent application, No. 62-133690 detects an edge mainly using the luminance components, the second Japanese patent application, No. 63-39284 more effectively detects edges by additionally using lamellar and vortex components.

The first and the second Japanese patent applications are the original applications of priority for U.S. Pat. No. 4,908,698 issued on Mar. 13, 1990.

The third Japanese patent application No. 2-066149 is the original application of priority for U.S. Pat. No. 5,148,501 which discloses data compression and reproduction of two-dimensional scalar data.

Since the present invention relates to edge detection, the contents of the first and second of the above Japanese patent applications will first be briefly described. An embodiment of the present invention carries out similar processes.

Generally, the chrominance component is expressed by a vector V, and when the Helmholtz theory is applied to the vector V, it is noted that the vector V can be expressed as:

$$V = \text{grad } L + \text{rot } (R \cdot K)$$

where L(x,y) is a scalar potential such as the luminance, and R·K is a vector potential having a direction expressed by a unit K in the direction of the Z axis.

The lamellar component is the first item, i.e., grad L, in the above expression, and the vortex component is the second item, i.e., rot (R·K), in the above expression. By detecting and transmitting an edge line of the chrominance component by detecting only divergence V and rotation V, that exceed predetermined threshold values, which are the values on the edge line of the chrominance component of the picture; the chrominance component of the color picture for every point can be reproduced by interpolation.

A similar discussion can be applied to the luminance component. For the luminance component, the vortex component rot V is zero.

As explained above, it is possible to use luminance components or chrominance components in detecting edges. Since the reproduction of the color image is effected by using the detected edges, it it important to correctly detect the edges even when the degree of change in the chrominance components or the luminance components is small. Conventionally, since the detected edges are directly used for reproduction of the original image, the precision of the reproduced image is not good.

SUMMARY OF THE INVENTION

An object of the present invention is to provide a system for precisely and correctly detecting an edge of an image.

To attain the above object, there is provided, according to the present invention, a system for correctly detecting an edge of an image in which a first edge is corrected by a second edge which is an edge of an error between an original image and a reproduced image obtained by using the first edge.

According to an aspect of the present invention, there is provided a system for detecting an edge of an image comprising: a first edge detecting unit for extracting a first edge of an original image by using a first threshold; a reproduction processing unit, operatively connected to the first edge detecting unit, for reproducing the original image to obtain a reproduced image corresponding to the original image by using the first edge; an error extracting unit, operatively connected to the reproduction processing unit, for extracting an error between the original image and the reproduced image; a second edge detecting unit, operatively connected to the error extracting unit, for detecting a second edge of the error extracted by the error extracting unit by using a second threshold smaller than the first threshold; and an edge correcting unit, operatively connected to the first edge detecting unit and the second edge detecting unit, for correcting the first edge by logically adding the first edge and the second edge to obtain a corrected reproduced image.

According to another aspect of the present invention, the system further comprises an image separating unit for separating the original image into image luminance components and image chrominance components, and error separating unit for separating the error into error luminance components and error chrominance components, the first edge being the edge of at least one of the image luminance components and the image chrominance components, and the second edge being the edge of at least one of the error luminance components and the error chrominance components.

According to still another aspect of the present invention, in the system, the first edge comprises image luminance divergence components that exceed the first threshold of the image luminance components, and the second edge comprises error luminance divergence components that exceed the second threshold of the error luminance components.

According to still further aspect of the present invention, in the system, the first edge comprises image chrominance divergence components that exceed the first threshold of the image chrominance components, and the second edge comprises error chrominance divergence components that exceed the second threshold of the error chrominance components.

According to still another aspect of the present invention, the system further comprises an image chrominance separating unit for separating the image chrominance components into image lamellar components and image vortex components, and an error chrominance separating unit for separating the error chrominance components into error lamellar components and error vortex components, the first edge being the edge of at least one of the image lamellar components and the image vortex components, and the second edge being the edge of at least one of the error luminance components and the error chrominance components.

According to still another aspect of the present invention, in the system, the first edge comprises image lamellar divergence components that exceed the first threshold of the image lamellar components, and the second edge comprises error lamellar divergence components that exceed the second threshold of the error lamellar components.

According to still another aspect of the present invention, in the system, the first edge comprises image vortex divergence components that exceed the first threshold of the image vortex components, and the second edge comprises error vortex divergence components that exceed the second threshold, of the error vortex components.

According to still another aspect of the present invention, in the system, the error extracting unit comprises a bulk error detecting unit for extracting a bulk error from the error; the bulk error expanding to a certain area.

According to still another aspect of the present invention, in the system, the bulk error detecting unit comprises an absolute value obtaining unit for obtaining the absolute value of a difference between the reproduced image output from the reproduction processing unit and the original image; an integration unit for calculating an integration of the output of the absolute value obtaining unit over a certain area, and a comparing unit for comparing the output of the integration unit with a predetermined threshold.

According to still another aspect of the present invention, the system further comprises a third edge detecting unit, operatively connected to receive the original image and to the edge correcting unit, for detecting a third edge of the original image by using a third threshold smaller than the first threshold, and a comparing unit, operatively connected to the second edge detecting unit and to the third edge detecting unit, for obtaining a difference between the second edge and the third edge, the first edge being corrected by adding the difference to the first edge.

According to still another aspect of the present invention, the system further comprises an image reproducing unit, operatively connected to the edge correcting unit, for reproducing the original image to obtain a corrected reproduced image by using the corrected edge obtained by the edge correcting unit.

BRIEF DESCRIPTION OF THE DRAWINGS

The above object and features of the present invention will be more clearly understood from the following description of the preferred embodiments with reference to the accompanying drawings, wherein.

DESCRIPTION OF THE PREFERRED EMBODIMENT

For a better understanding of the present invention, a conventional technique of edge detection is first described with reference to FIGS. 1 to 3. The discussion relating to the separation of the luminance and chrominance components is applied to a television transmission. In conventional television transmission, a color image is transmitted and reproduced by transmitting luminance and chrominance components of pixels of the color image.

For three primary colors R, G, and B, the following is prepared:

(a) Luminance component Y

Y=0.2988R+0.5868G+0.1144B (b) Chrominance components I and Q of a chromaticity vector

I=0.736(R−Y)−0.286(B−Y)

Q=0.478(R−Y)−0.413(B−Y)

These Y, I, and Q are transmitted. For example, the I and Q are transmitted on a subcarrier.

A color image is conventionally transmitted in this way. Color signals (chrominance component signals) contain a considerable quantity of energy components. Therefore, if it is possible to reduce a part of the energy of color signals, it will be advantageous for compressing a transmission band and for chromaticity data processing.

Figure 1:
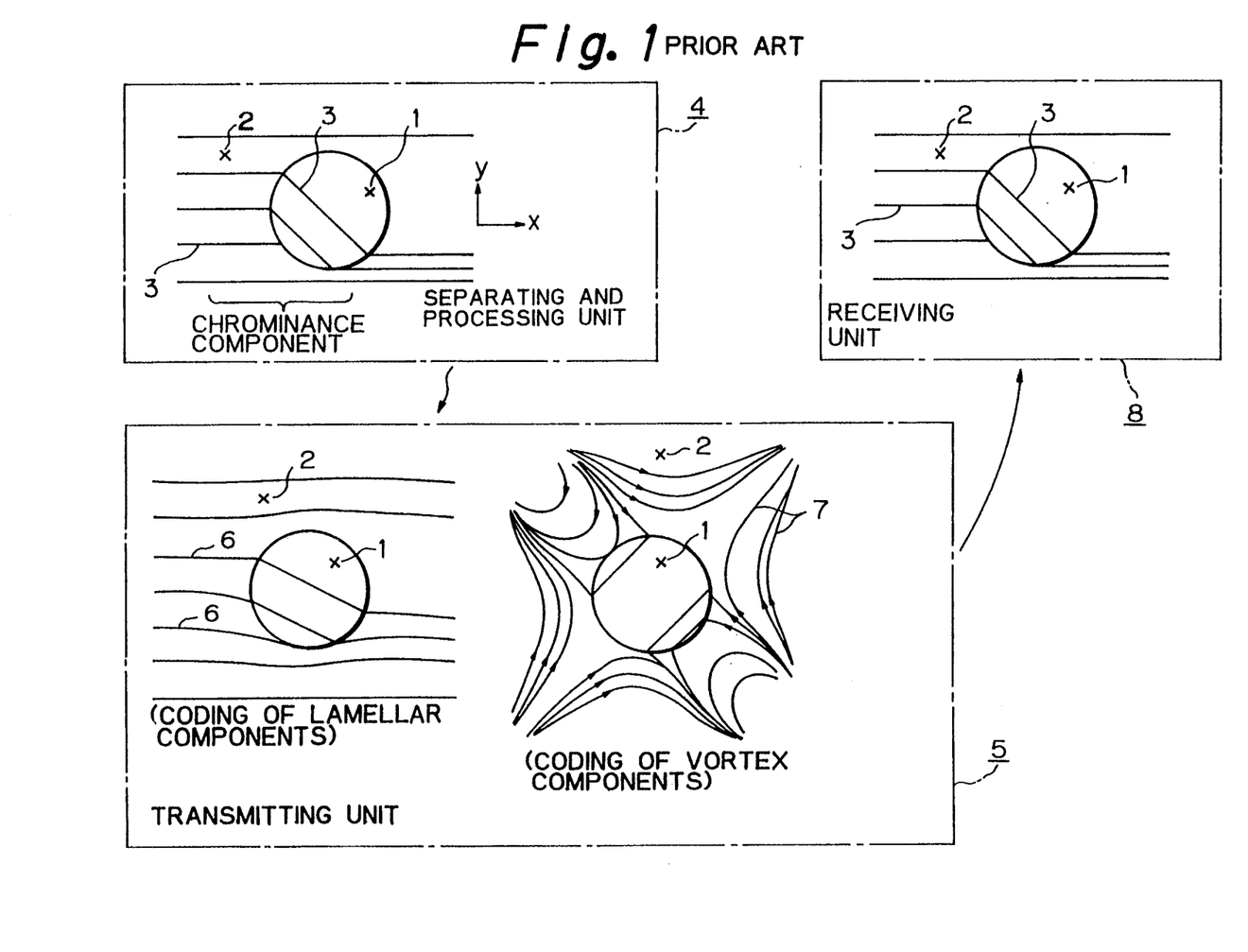
FIG. 1 is a view explaining a principle of a conventional image transmission.

To make it possible to reduce a part of the energy of the color signals, a conventional transmission processing system as shown in FIG. 1 has been proposed in view of the fact that the above-mentioned chrominance components can be represented with vector signals such as I and Q.

In FIG. 1, numeral 1 represents a circle plate with a certain color forming a given color image, 2 represents a background of the color image with a different color from the color image, and 3 represents vector lines representing a chrominance component of the color image. A horizontal straight section of the vector line 3 indicates a background color provided for the background 2. A straight oblique section of the vector line 3 indicates that the circle 1 has a different color from the background color.

Numeral 4 is a separating and processing unit for separating the color image into luminance and chrominance components, and the chrominance component is separated into lamellar and vortex components as explained later in more detail.

Numeral 5 is a transmission unit for encoding the lamellar and vortex components. In accordance with requirements the vortex components may not be encoded, or the number of bits thereof may be reduced for encoding because the percentage of the energy of the vortex component in the color image is very small. In the transmission unit 5, numeral 6 is a segment representing a lamellar component, and 7 is a segment representing a vortex component. By the encoding of the lamellar component and the vortex component, data of luminance component and the chrominance component are obtained and are transmitted together.

Numeral 8 is a receiving unit that synthesizes the original color image by using the luminance component and the chrominance component.

As mentioned above, a color image is separated into luminance and chrominance components. The known chrominance component is given as a vector signal such as I and Q. Namely, according to an NTSC television transmission system, a vector V is expressed as follows:

$$V = \begin{pmatrix} I \\ Q \end{pmatrix}$$

In this way, a chrominance component can be expressed as a vector V, which may also be expressed as follows.

$$V = \begin{pmatrix} \xi \\ \eta \end{pmatrix}$$

When the Helmholz theorem is applied to the vector V, the following is provided.

$$V = \mathrm{grad} + \mathrm{rot}(A \cdot K)$$

Therefore, the above expression can be expressed as:

$$V = \begin{pmatrix} \xi \\ \eta \end{pmatrix} = \begin{pmatrix} \phi_x \\ \phi_y \end{pmatrix} = \begin{pmatrix} A_x \\ A_y \end{pmatrix}$$

where:
o represents a scalar potential such as luminance;

A·K represents a vector potential whose direction is indicated with a unit vector k that is orthogonal to the plane of FIG. 1 (i.e., in the direction of an axis z)

$o_x = \partial o / \partial x$
$o_y = \partial o / \partial y$
$A_x = \partial A / \partial x$
$A_y = \partial A / \partial y$ For the vector V, div V is obtained as follows:

$$\begin{aligned} \mathrm{div}\, V &= \mathrm{div}\, \mathrm{grad}\, \phi + \mathrm{div} \cdot \mathrm{rot}(A \cdot k) \\ &= \mathrm{div} \cdot \mathrm{grad}\phi \end{aligned}$$

Therefore, the following is obtained:

$$\begin{aligned} \mathrm{div}\, V &= \mathrm{div} \cdot \mathrm{grad}\phi \\ &= \xi_x + \eta_y \\ &= \phi_{xx} + \phi_{yy} \end{aligned} \quad (1)$$

Further, for the vector V, rot V is obtained as follows:

$$\begin{aligned} \mathrm{rot}\, V &= \mathrm{rot} \cdot \mathrm{rot}(A\, k) \\ &= \xi_y - \eta_x \\ &= A_{xx} + A_{yy} \end{aligned} \quad (2)$$

In the above expressions (1) and (2),
$\xi_x = \partial \xi / \partial x$
$\xi_y = \partial \xi / \partial y$
$\eta_x = \partial \eta / \partial x$
$\eta_y = \partial \eta / \partial y$
$o_{xx} = \partial^2 o / \partial x^2$
$o_{yy} = \partial^2 o / \partial y^2$
$A_{xx} = \partial^2 A / \partial x^2$
$A_{yy} = \partial^2 A / \partial y^2$ In each of the equations (1) and (2), the left side is measurable. Therefore, o and A can be be obtained by solving the equations (1) and (2).

The value o is a potential representing a lamellar component of the vector V. The lamellar component o can be represented by the lines 6 corresponding to the circle plate 1 and the background 2 having different colors, as shown in FIG. 1. The value A is a potential representing a vortex component of the vector V. The vortex component A can be represented by the lines 7 corresponding to the circle plate 1 and the background 2, as shown in FIG. 1.

By transmitting the lamellar component o and the vortex component A as well as the luminance component, the receiving unit 8 can reproduce the original color image.

According to a simulation test carried out with a standard GIRL image (a GIRL's color image) prescribed by the Society of Motion Picture and Television Engineers of the U.S.A., energy of the vortex component A is only 2.25% of that of the lamellar component o. Accordingly, it is understood that, even if the vortex component A is omitted or even if only a small quantity of data for the vortex component A are transmitted, the original color image can be reproduced without greatly deteriorating its quality.

It is of course possible to transmit all of the vortex component. The receiving unit 8 in FIG. 1 reproduces the original color image by using the transmitted luminance components and chrominance codes.

Figure 2:
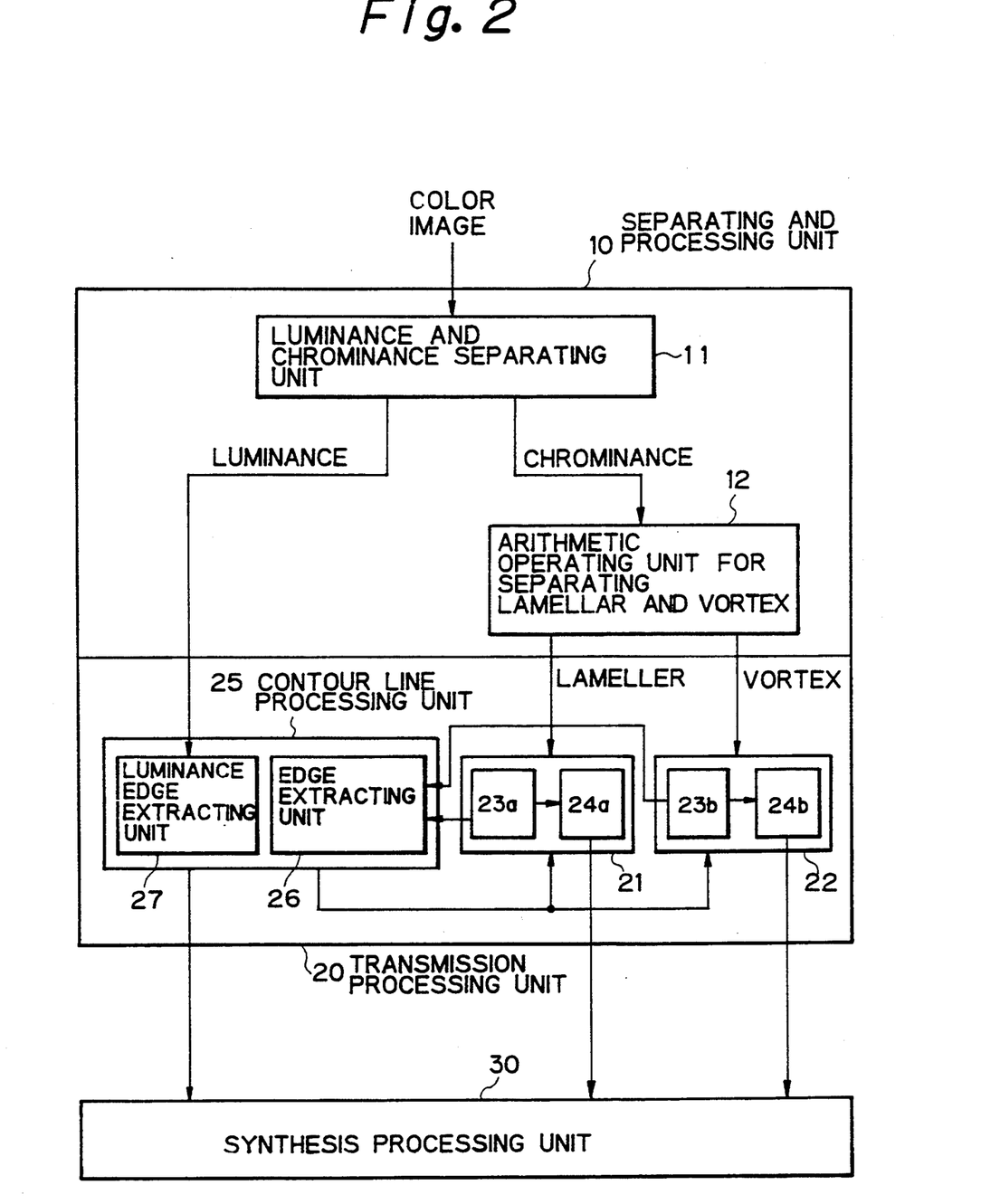
FIG. 2 is a block diagram showing a practical example of a conventional color image transmitting system that can be applied to the present invention by modifying the system.

FIG. 2 shows a more practical example of a conventional color image transmitting system that can be applied to an embodiment of the present invention by modifying a part of the system. In FIG. 2, reference numeral 10 is a separating and processing unit that is like the separating and processing unit 4 in FIG. 1, 20 is a transmission processing unit that is present in the transmission unit 5 in FIG. 1, and 30 is a synthesis processing unit that is present in the receiving unit 8 in FIG. 1.

Reference numeral 11 is a luminance and chrominance separating unit that separates a given color image into luminance and chrominance components. As mentioned above, a chrominance component is expressed as follows:

$$V = \begin{pmatrix} \xi \\ \eta \end{pmatrix}$$

It is preferable to use weighted chrominance components $\xi'$ and $\eta'$ by weighting the components $\xi$ and $\eta$ by the luminance Y, as follows.

$$\xi' = \xi/[a+(1-a)Y]$$

$$\eta' = \eta/[a+(1-a)Y]$$

where "a" is a bias given as $0<a<1$ to equalize the chrominance component vectors from 0 to $2\eta$ Numeral 12 is an arithmetic operating unit for separating the chrominance components into the lamellar components and and vortex components.

The transmission processing unit 20 includes a lamellar transmission processing unit 21, a vortex transmission processing unit 22, and a contour processing unit 25.

The lamellar transmission processing unit 21 includes a lamellar vector analyzing and connecting unit 23a for providing a divergence component of the lamellar component separated by the arithmetic operating unit 12 and preparing an edge by taking values greater than a certain threshold value, and a lamellar encoding unit 24a for band-compressing and encoding the divergence component provided by the lamellar vector analyzing and connecting unit 23a and the lamellar component separated by the arithmetic operating unit 12.

The vortex transmission processing unit 22 comprises a vortex vector analyzing and connecting unit 23b for providing a rotation component of the vortex component separated by the arithmetic operating unit 12 and preparing an edge by taking values greater than a certain threshold value, and a vortex encoding unit 24b for band-compressing and encoding the rotation component output from the vortex vector analyzing and connecting unit 23b and the vortex component separated by the arithmetic operating unit 12.

The contour processing unit 25 comprises an edge extracting unit 26 for comparing either one or both of the outputs of the lamellar vector analyzing and connecting unit 23a and vortex vector analyzing and connecting unit 23b with a predetermined reference value, thereby detecting edges of a color image, and an luminance edge extracting unit 27 for extracting edges of the color image according to the luminance component separated by the luminance and chrominance separation unit 11.

The synthesis processing unit 30 receives the encoded data from the lamellar encoding unit 24a and vortex encoding unit 24b and the contour data from the contour processing unit 25, and synthesizes a color image.

Around edges of the color image, the divergence component output from the lamellar vector analyzing and connecting unit 23a for obtaining the divergence component of the lamellar component, and the rotation component output from the vortex vector analyzing and connecting unit 23b for obtaining the rotation component of the vortex component will not be zero but will be very large values; the edges being formed because of chrominance differences. On the other hand, on parts other than the edges, these values will be zero because the chrominance is uniform in these areas.

Accordingly, the edge extracting unit 26 detects edges of a color image by comparing a divergence component output from the lamellar vector analyzing and connecting unit 23a and a rotation component output from the vortex vector analyzing and connecting unit 23b with a predetermined reference value. Therefore, edges due to chrominance differences are detectable even if there is no luminance difference.

In the above-mentioned color image edge detecting system, if edges detected by the luminance edge extracting unit 27 are added to the edges detected by the edge detecting unit 26, the resulted edges will be more correct edges of the color image. Lamellar and vortex components on a specific axis, divergence components of the lamellar components provided by the lamellar vector analyzing and connecting unit 23a, and rotation components of the vortex components provided by the vortex vector analyzing and connecting unit 23b are encoded and transmitted to the synthesis processing unit 30, which then combines chrominance components on all axes together.

At this time, the divergence and rotation components are considered to be zero anywhere except the edges, so that these components can be omitted from the transmission signal in a similar way as in a monochrome image band compression for compressing the luminance components. As a result, the color image is transmitted with a very small quantity of encoded data.

A known principle of edge detection of a color image by using chrominance components will be roughly explained with reference to FIG. 3.

Figure 3:
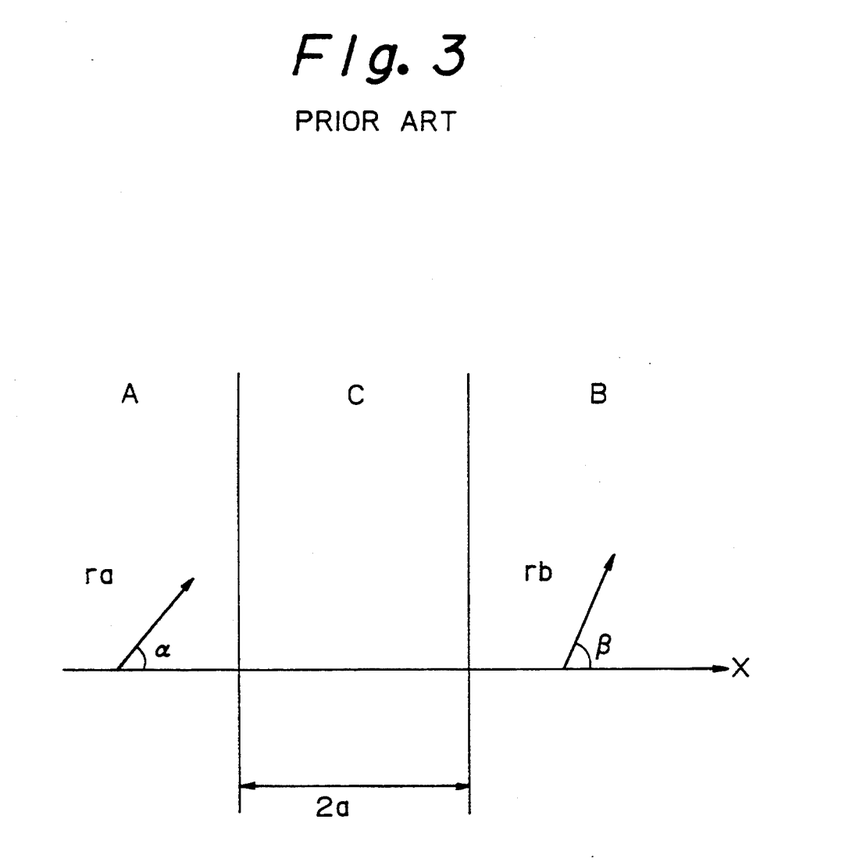
FIG. 3 is a view explaining a known principle of edge detection of a color image by using chromaticity vectors.

In FIG. 3, areas A and B have different chrominance vectors. The areas A and B are continuous with an area C having a width $2a$ interposing between them. Assume that a chrominance vector for the area A is $V_A$ and a chrominance vector for the area B is $V_B$. Then, the vectors $V_A$ and $V_B$ can be expressed as:

$$V_A = \begin{pmatrix} \gamma_a \cos\alpha \\ \gamma_a \sin\alpha \end{pmatrix}$$

$$V_B = \begin{pmatrix} \gamma_b \cos\beta \\ \gamma_b \sin\beta \end{pmatrix}$$

where $\gamma_a$ is the absolute value of the vector $V_A$. $\gamma_b$ is the absolute value of the vector $V_B$, $\alpha$ is the angle of the vector $V_A$ with respect to the x axis, and $\beta$ is the angle of the vector $V_B$ with respect to the x axis. In the edge between the area A and B, namely, in the edge area C, div V and rot V can be expressed as:

$$\mathrm{div}\ V = (\tfrac{1}{2}a)(\gamma_b \cos\beta - \gamma_a \cos\alpha)$$

$$\mathrm{rot}\ V = (\tfrac{1}{2}a)(\gamma_b \sin\beta - \gamma_a \sin\alpha)$$

As is apparent from these equations, the absolute values of div V and rot V are not zero but are large values around the edge C of the color image and nearly zero anywhere except the edges.

Consequently, the edges are detected by detecting positions where one or both of the absolute values of div V and rot V are larger than a predetermined value.

As explained above, it is possible to detect edges of an image by detecting divergence components and the rotation components of the luminance components or chrominance components, however, if the original image has a gradually changing edge for example, or if the change of the components is very small, the conventional method cannot detect the edge of the original image, because the edge detection is effected only one time by using a single threshold for each component.

It is important to correctly detect the edges even when the the degree of change in the chrominance components or the luminance components is small. Conventionally, since the detected edges are directly used for reproduction of the original image, the precision of the reproduced image is not good. In other words, the threshold values detecting the edges are too large so that gradually changing edges cannot be detected.

Now, an embodiment of the present invention is described.

Figure 4:
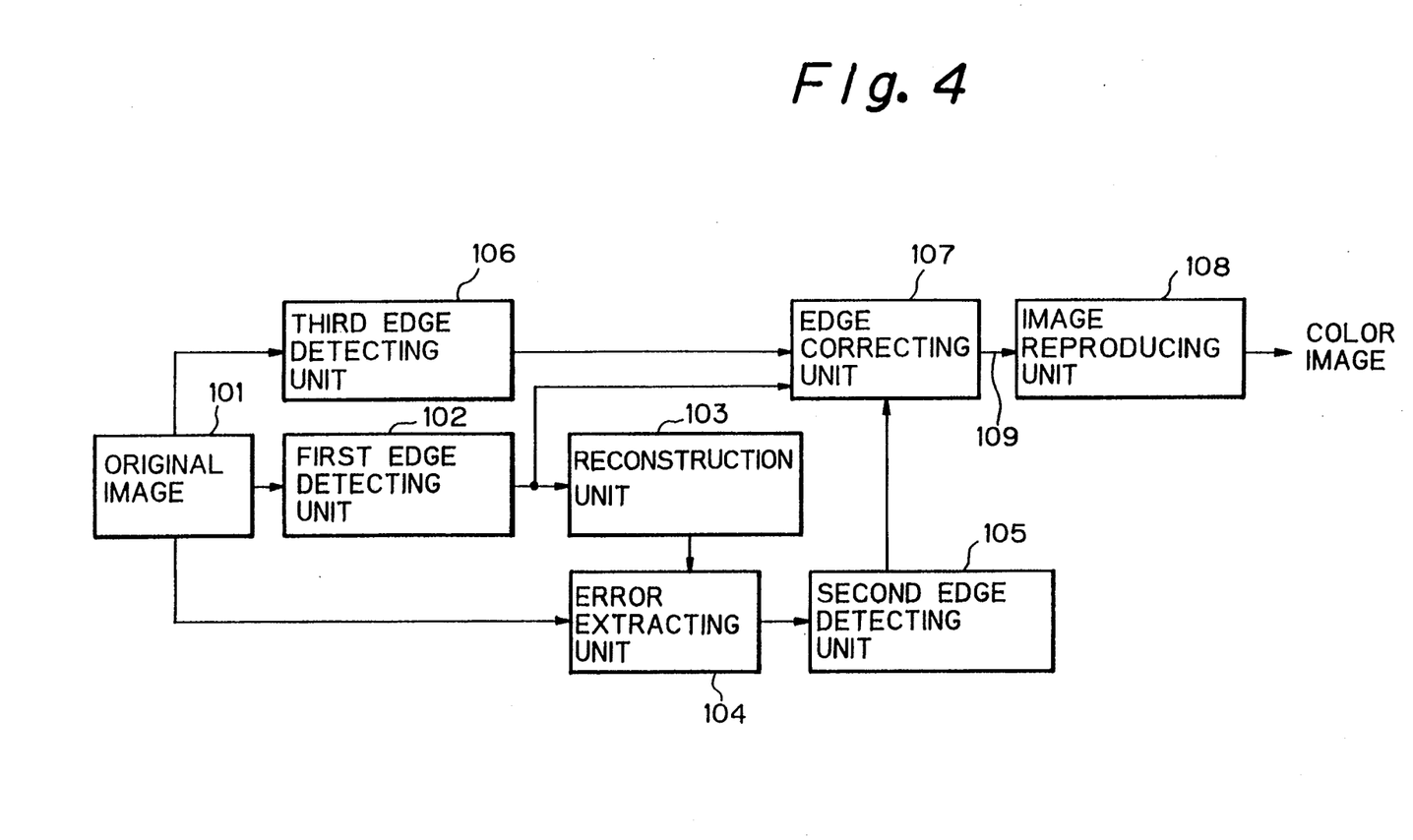
FIG. 4 is a block diagram of an edge detecting system according to an embodiment of the present invention.

FIG. 4 is a block diagram showing an edge detecting system according to an embodiment of the present invention. In the figure, numeral 101 denotes an original color image, and 102 is a first edge detecting unit. The first edge detecting unit 102 employs known means such as the separating and processing unit 10 and transmission processing unit 20 in FIG. 2, to detect edges or contours of the original color image 101 by using a predetermined threshold t.

Numeral 103 is a reproduction processing unit that employs known means such as the synthesis processing unit 30 in FIG. 2, to reproduce the original color image.

Conventionally, only the units 102 and 103 are used to reproduce the original color image. Since the threshold t in the first edge detecting unit 102 is too large for a gradually changing edge, a correct edge cannot be detected.

According to an embodiment of the present invention, a bulk error extracting unit 104, and a second edge detecting unit 105 is provided. The bulk error extracting unit 104 compares the original color image 101 and the image reproduced by the reproduction processing unit 103 to find errors between them. In addition, the bulk error extracting unit 104 extracts a bulk error that is not a mere noise error but an error expanding on a certain area of the image.

The second edge detecting unit 105 employs an edge detection means that is similar to that employed by, for example, the first edge detecting unit 102, and finds edges from an error image based on the bulk error extracted by the bulk error extracting unit 104. A threshold for the second edge detecting unit 105 is selected to be sufficiently small so as to be able to detect more edges than the edges detected by the first edge detecting unit 102 at positions where the edges are expected to exist. The threshold for the second edge detecting unit 105 is $t/C_1$, where $C_1$ is a constant larger than 1.

Although it is not essential for the invention, according to a second embodiment of the present invention, a third edge detecting unit 106 may be included. The third edge detecting unit 106 detects edges from the original color image 101 in a similar manner to that of, for example, the first edge detecting unit 102. A threshold for the third detecting unit 106 is $t/C_2$, where $C_2$ is a constant larger than 1, so that the unit 106 may detect more edge-like objects than the first edge detecting unit 102.

Numeral 107 is an edge correcting unit. When the third edge detecting unit 106 is not used according to the first embodiment, the edge correcting unit 107 logically adds the outputs from the first edge detecting unit 102 and from the second edge detecting unit 105 to obtain a correct edge. When the third edge detecting unit 106 is used according to the second embodiment, the edge correcting unit 107 first compares the output of the second edge detecting unit 105 and the output of the third edge detecting unit 106 to detect a new edge that was detected both by the second and third edge detecting units, and then adds the above-mentioned new edge to the output of the first edge detecting unit 102. Namely, according to the second embodiment, an add logic is effected on the edges extracted from the bulk error image by the second edge detecting unit 105 and the many edges extracted by the third edge detecting unit 106 to find edge locations that have been missed by the first edge detecting unit 102, and then the edges that have been missed and found are added to the edges detected by the first edge detecting unit 102 to thereby provide correct edges.

Numeral 108 is an image reproduction processing unit that reproduces a color image using means similar to the reproduction processing unit 103 in FIG. 2. The only difference between the conventional reproduction processing unit 108 and the conventional reproduction processing unit 103 is that the unit 108 of the present invention uses the corrected edges obtained as described above, whereas, the conventional reproduction processing unit 103 directly uses the edges detected by the first edge detecting unit 102.

Note that the edge correction unit 107 and the image reproduction processing unit 108 are connected by a transmission line 109.

Generally describing the operation, an edge detecting system according to the embodiments of the present invention processes the original color image 101, provides a reproduced color image; obtains an error image between the original image and the error image; detects edges on the error image; and corrects edges by adding edges that have been missed from the reproduced image.

Figure 5A:
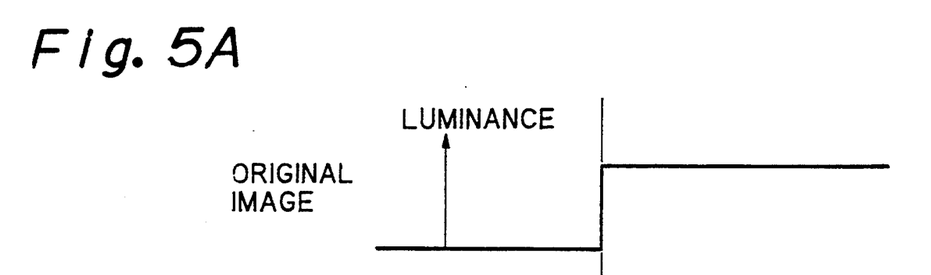
FIG. 5A to FIG. 5E are views explaining the edge detection by the edge detecting system shown in FIG. 4.
Figure 5B:
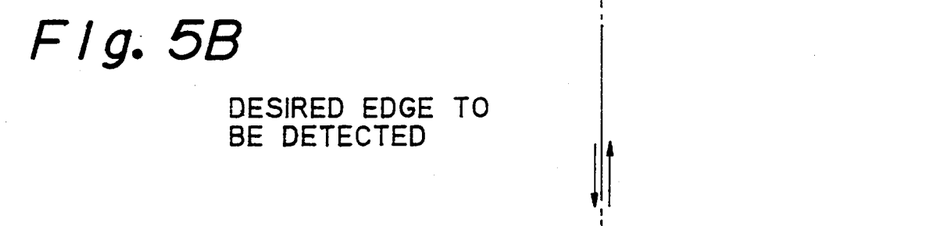
Figure 5C:
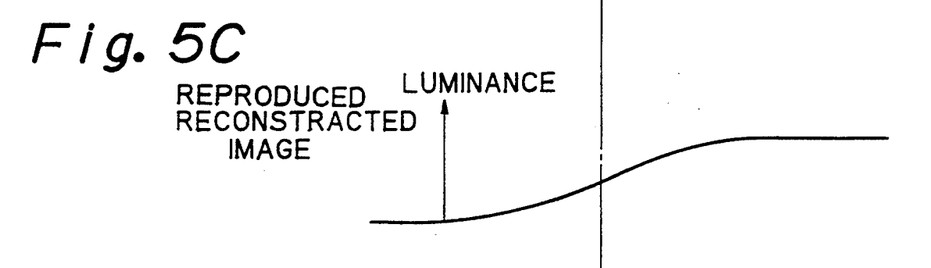
Figure 5D:
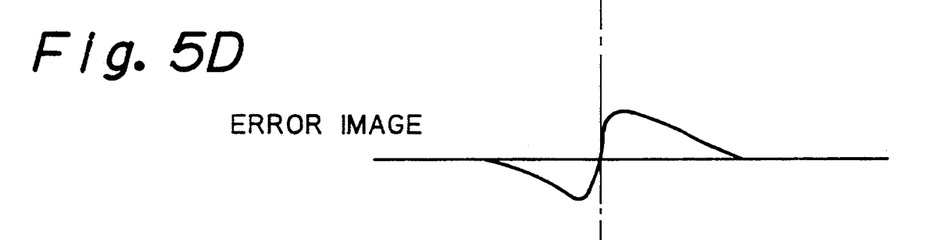
Figure 5E:
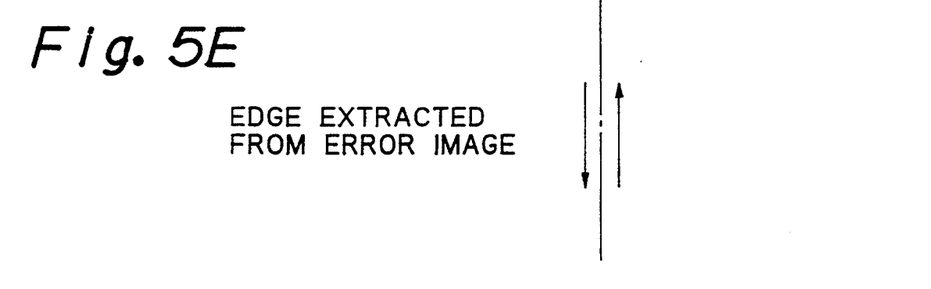

FIGS. 5A to 5E are views explaining the edge detection carried out on the error image. Although FIGS. 5A to 5E explain the edge detection by detecting a change of luminance components, it should be noted that the edge detection may also be carried out by detecting a change of chrominance components. FIG. 5A shows a position of a change of, for example, luminance on the original image. If the change shown in FIG. 5A is too small in comparison with the threshold value t of the first edge detecting unit 102, the edge corresponding to the change cannot be detected. FIG. 5B shows an original edge to be detected. FIG. 5C is a reproduced image provided by the reproduction processing unit 103 when the edge cannot be detected because the change in luminance shown in FIG. 5A is too small in comparison with the threshold value t. FIG. 5D shows an error image obtained by the second error detecting unit 105. FIG. 5E shows the corrected edge obtained at the output of the edge correcting unit 107 by using the error image shown in FIG. 5D.

As shown in FIGS. 5A to 5E, according to the embodiment of the present invention, the edge is extracted by using the error image, and the desired edge can be obtained by using the outputs of the first and the second edge detecting units 103 and 105.

Figure 6:
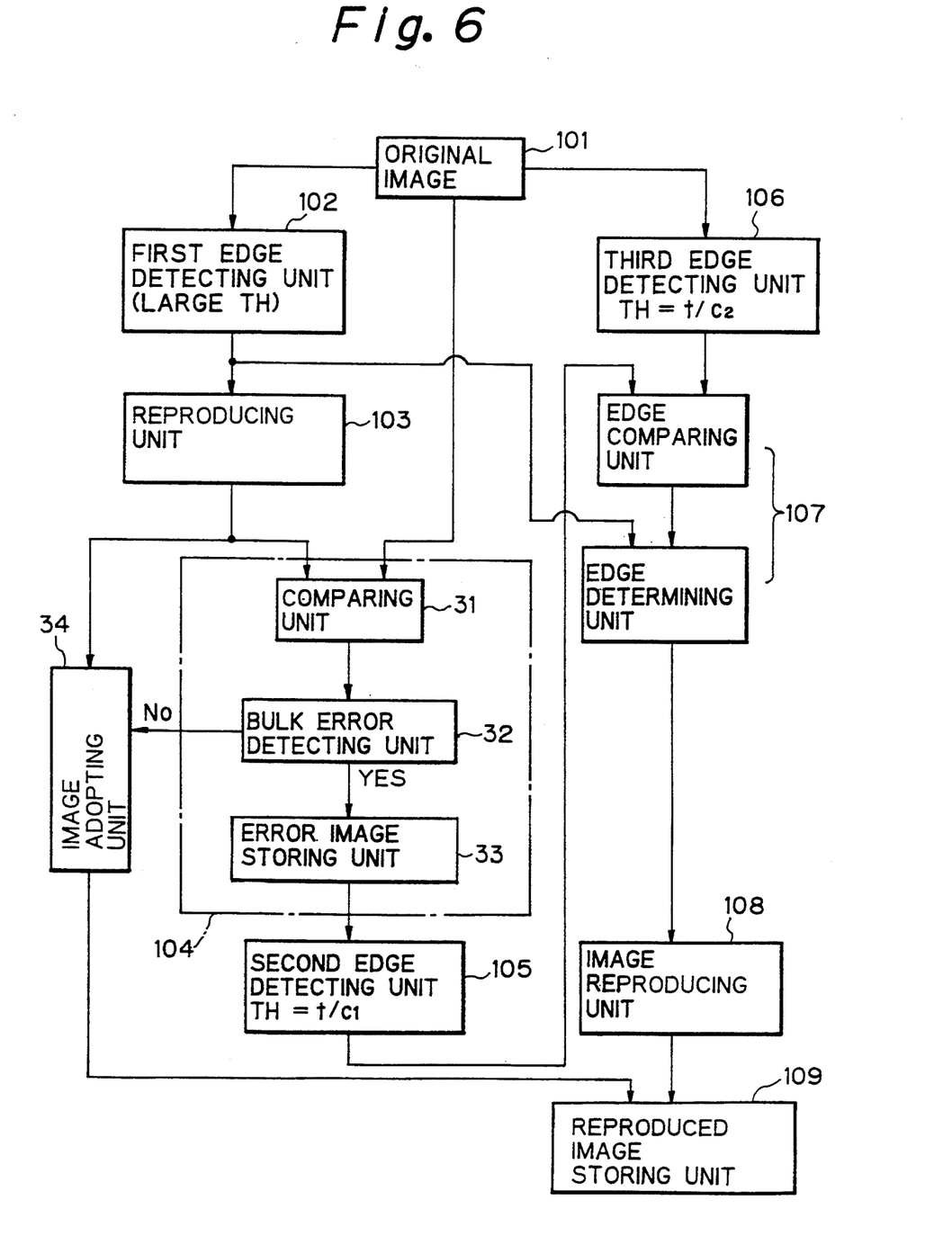
FIG. 6 is a detailed block diagram of the edge detecting system shown in FIG. 4.

FIG. 6 is a block diagram showing the edge detecting system according to the second embodiment of the invention in more detail. In FIG. 6, the reference numerals correspond to those in the system shown in FIG. 4, and therefore, explanations of the same are omitted. The bulk error extracting unit 104 and the edge correcting unit 107 will be described in detail.

The bulk error extracting unit 104 includes a comparing unit 31, a bulk error detecting unit 32, and an error image storing unit 33. The comparing unit 31 compares a reproduced image provided by the reproduction processing unit 103 with the original color image 101 to generate a difference between them. The bulk error detecting unit 32 extracts a bulk error from the difference output from the comparing unit 31. The bulk error and an error caused by a simple noise are separable from each other because the error caused by a simple noise is local. In this way, an error image is obtained.

The edge correcting unit 107 includes an edge comparing unit 35 and an edge determining unit 36. The edge comparing unit 35 compares many edges that may include those that are not real edges detected by the third edge detecting unit 106 with edges output from the second edge detecting unit 105. The collated or coincident edges correspond to edges missed by the first edge detecting unit 102, and therefore, the missed edges are added to the output of the first edge detecting unit 102 by the edge determining unit 36 to determine correct edges.

After the correct edges are determined, the image reproduction processing unit 108 reproduces the original image. It should be noted that, when the bulk error extracting unit 104 detects no bulk error, it is understood that the first edge detecting unit 102 has correctly detected the edges, and the image provided by the reproduction processing unit 103 is naturally adopted by an image adopting unit 34 in the same way as in the conventional system.

The image reproduced by the image reproducing unit 108 or the image adopted by the image adopting unit 34 is stored in a reproduced image storing unit 109.

The three edge detecting units 102, 105, and 106 may be realized by a single edge detecting unit having three different thresholds. Also, the reproduction processing unit 103 and the reproduction image processing unit 108 may be realized by a single processing unit.

Instead of the luminance edge extracting unit 27 in the conventional system shown in FIG. 2, the edge detecting system shown in FIG. 6 is used according to an embodiment of the present invention. In this case, the original image 101 in FIG. 6 represents the luminance components separated from the luminance and chrominance separating unit 11 in FIG. 2. Also, instead of the edge extracting unit 26, the edge detecting system shown in FIG. 6 is used for detecting edges with respect to the lamellar components. In this case, the original image 101 in FIG. 6 represents the divergence components of the lamellar components separated from the chrominance components by the arithmetic operating unit 12 in FIG. 2. In the edge extracting unit 26 in FIG. 2, the edge detecting system shown in FIG. 6 may also be used for detecting edges with respect to the vortex component. In this case, the original image 101 in FIG. 6 represents the rotation components of the vortex components separated from the chrominance components by the arithmetic operating unit 12 in FIG. 2.

Figure 7:
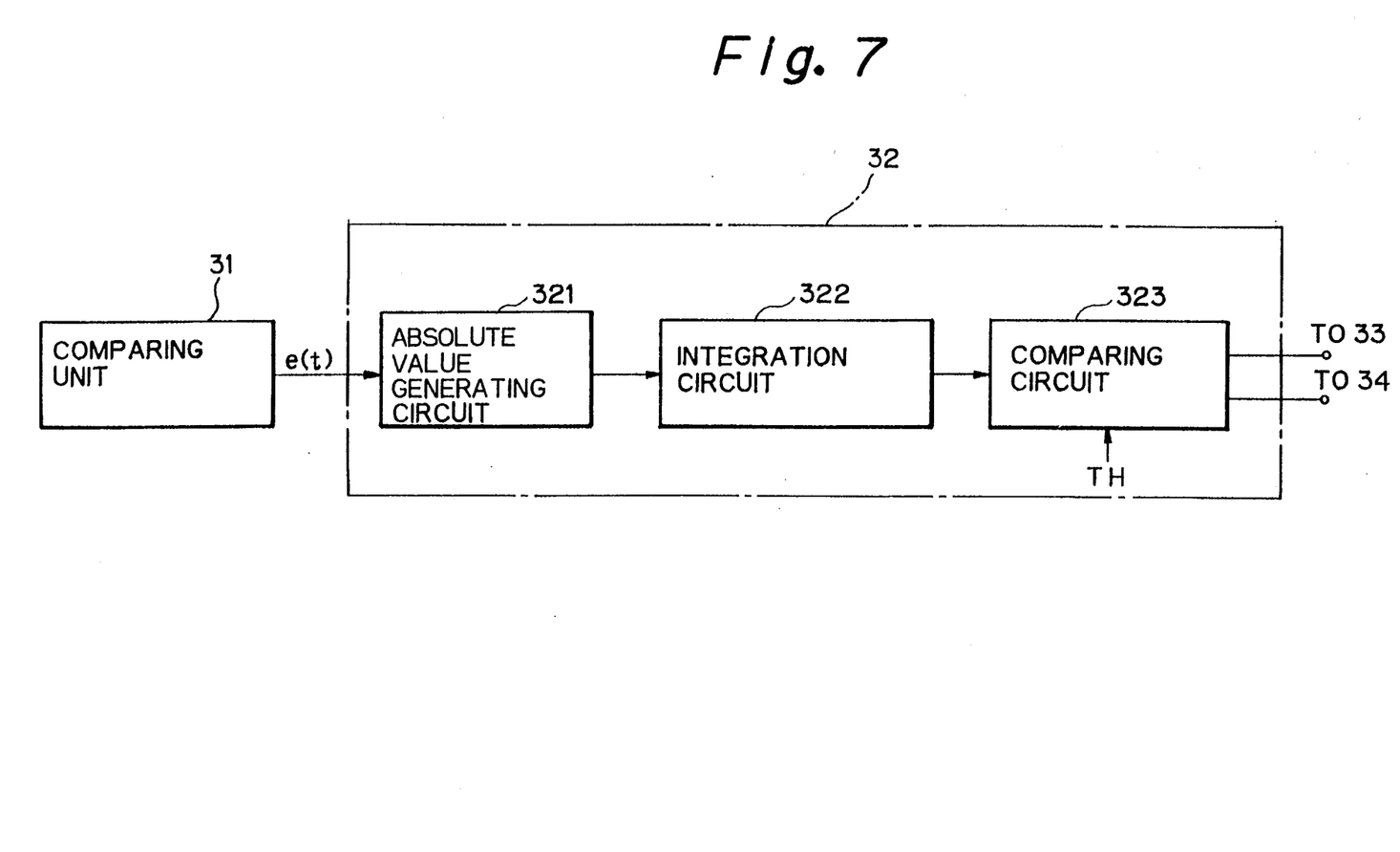
FIG. 7 is a block diagram showing the construction of the bulk error detecting unit 32 in the system shown in FIG. 6.

FIG. 7 is a block diagram showing the constitution of the bulk error detecting unit 104 in detail. In FIG. 7, the bulk error detecting unit 104 includes an absolute value generating circuit 321, an integration circuit 322, and a comparing circuit 323. The absolute value circuit 321 generates an absolute value of an error signal component provided from the comparing unit 31. The integration circuit 322 integrates the absolute value over a predetermined area. The comparing circuit 323 compares the integrated value with a certain threshold TH. If the integrated value exceeds the threshold TH, the integrated value is given as an error image to the error image storing unit 33. If the integrated value is smaller than the threshold TH, the integrated value is not deemed as an error image so that the output of the reproduction processing unit 103 is adopted as a reproduced image.

FIGS. 8 through 11 are views explaining the effects of edge detection according to the embodiment of the present invention.

Figure 8:
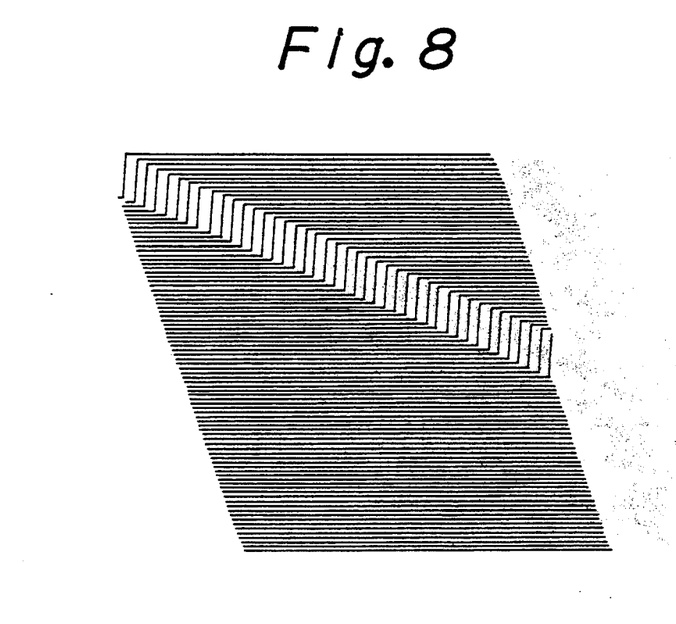
FIG. 8 is a view showing a desired image.

FIG. 8 shows a desired image that is the same as an original color image. In the figure, chrominance components, for example, change at edges.

Figure 9:
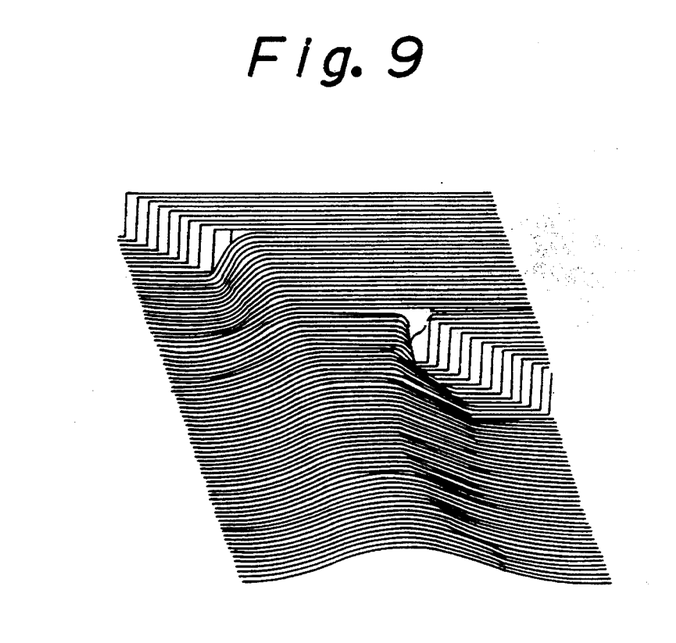
FIG. 9 is a view showing a reproduced image when edges are deleted.

FIG. 9 shows a reproduced image when a part of the original image is intentionally deleted. Because of the deletion of edges, the chrominance components in the reproduced image smoothly change at the positions where the edges have been deleted.

Figure 10:
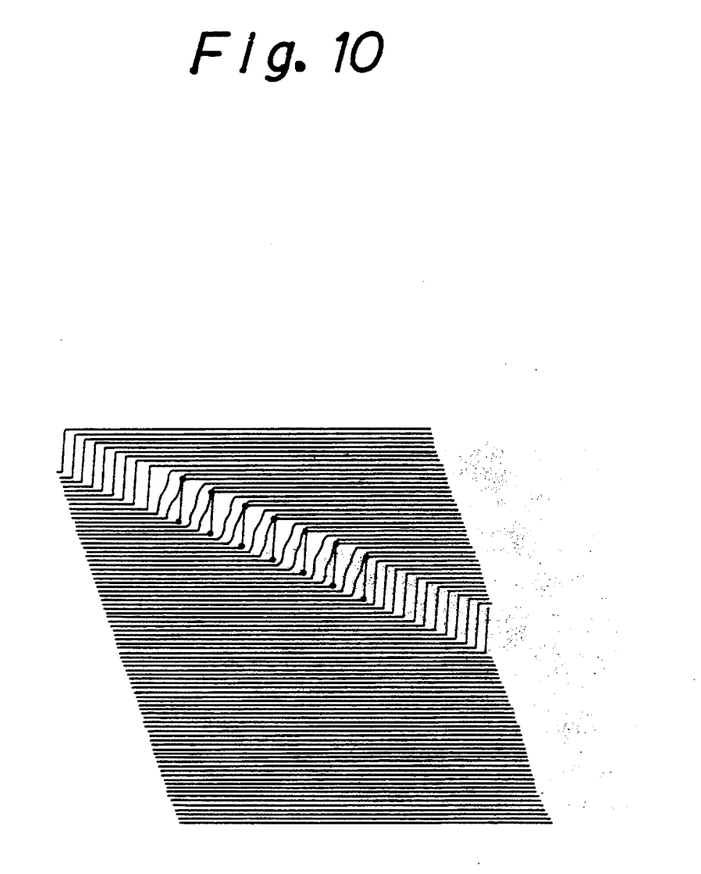
FIG. 10 is a view showing an image obtained by the system shown in FIG. 6.

FIG. 10 shows a color image after correcting the edges according to the embodiment of the present invention. In FIG. 10, the deleted edges have been corrected. Black dots in FIG. 10 indicate the positions where edges have been supplemented. Based on the supplemented edges, an interpolation process is carried out for intermediate areas.

Although FIGS. 8 to 10 explain the edge detection with respect to the chrominance components of the original image, it is of course possible to correctly detect the edges of the luminance components. Further, with respect to the chrominance components, vortex components may be neglected so that only the correct edges with respect to the lamellar components may be detected.

As described in detail above, according to the present invention, edges missed in the first edge detecting unit are accurately and correctly supplemented and a correct reproduced image can be obtained.

What is claimed is:

1. A system for detecting an edge of an image, comprising:

first edge detecting means for extracting a first edge of an original image using a first threshold;

reproduction processing means, operatively connected to said first edge detecting means, for obtaining a reproduced image corresponding to the original image using the first edge;

error extracting means, operatively connected to said reproduction processing means, for extracting an error between the original image and the reproduced image;

second edge detecting means, operatively connected to said error extracting means, for detecting a second edge in the error extracted by said error extracting means using a second threshold smaller than the first threshold; and edge correcting means, operatively connected to said first edge detecting means and said second edge detecting means, for correcting said first edge by logically adding said first edge and said second edge to obtain a corrected edge in a corrected reproduced image.

2. A system for detecting an edge of an image as claimed in claim 1, further comprising:

image separating means for separating the original image into image luminance components and image chrominance components, and error separating means for separating the error into error luminance components and error chrominance components, the first edge represented by at least one of the image luminance components and the image chrominance components, and the second edge represented by at least one of the error luminance components and the error chrominance components.

3. A system for detecting an edge of an image as claimed in claim 2, wherein the first edge includes image luminance divergence components that exceed said first threshold of the image luminance components, and the second edge includes error luminance divergence components that exceed the second threshold of the error luminance components.

4. A system for detecting an edge of an image as claimed in claim 2, wherein the first edge includes image chrominance divergence components that exceed the first threshold of the image chrominance components, and the second edge includes error chrominance divergence components that exceed the second threshold of the error chrominance components.

5. A system for detecting an edge of an image as claimed in claim 2, further comprising:

image chrominance separating means for separating the image chrominance components into image lamellar components and image vortex components, and error chrominance separating means for separating the error chrominance components into error lamellar components and error vortex components, the first edge represented by at least one of the image lamellar components and the image vortex components, and the second edge represented by at least one of the error luminance components and the error chrominance components.

6. A system for detecting an edge of an image as claimed in claim 5, wherein the first edge including image lamellar divergence components that exceed the first threshold of the image lamellar components, and the second edge includes error lamellar divergence components that exceed the second threshold of the error lamellar components.

7. A system for detecting an edge of an image as claimed in claim 5, wherein the first edge includes image vortex divergence components that exceed the first threshold of the image vortex components, and the second edge includes error vortex divergence components that exceed the second threshold of the error vortex components.

8. A system for detecting an edge of an image as claimed in claim 1, wherein said error extracting means comprises bulk error detecting means for extracting a bulk error from the error, the bulk error expanding to a certain indicating error in an area.

9. A system for detecting an edge of an image as claimed in claim 1, wherein said bulk error detecting means comprises:

absolute value obtaining means for obtaining the absolute value of a difference between the reproduced image output from said reproduction processing means and the original image, integration means for calculating an integration of the absolute value output by said absolute value obtaining means over a predetermined area, and comparing means for comparing the integration output by said integration means with a predetermined threshold.

10. A system for detecting an edge of an image as claimed in claim 1, further comprising:

third edge detecting means, operatively connected to receive the original image and to said edge correcting means, for detecting a third edge of the original image using a third threshold smaller than the first threshold, and comparing means, operatively connected to said second edge detecting means and to said third edge detecting means, for obtaining a difference between the second edge and the third edge, the first edge being corrected by adding the difference to the first edge.

11. A system for detecting an edge of an image as claimed in claim 1, further comprising image reproducing means, operatively connected to said edge correcting means, for generating the corrected reproduced image using the corrected edge obtained by said edge correcting means.

* * * * *

UNITED STATES PATENT AND TRADEMARK OFFICE
CERTIFICATE OF CORRECTION

PATENT NO. : 5,444,798

DATED : August 22, 1995

INVENTOR(S) : Enomoto et al.

It is certified that error appears in the above-indentified patent and that said Letters Patent is hereby corrected as shown below:

Title Page, Col. 2, line 7, delete "pl"; "apr." should be --Apr.--.

Col. 6, lines 4, 5, 35 and 36, "O" (both occurrences) should be --$\phi$--;

lines 40, 42, 43, 51 and 61, "O" should be --$\phi$--.

Claims:
Col. 14, line 20, delete "expanding to a";

line 21, delete "certain".

Signed and Sealed this

Twenty-seventh Day of February, 1996

Attest:

BRUCE LEHMAN

Attesting Officer     *Commissioner of Patents and Trademarks*